United States Patent
Sugihara et al.

(10) Patent No.: US 11,798,552 B2
(45) Date of Patent: Oct. 24, 2023

(54) AGENT DEVICE, AGENT CONTROL METHOD, AND PROGRAM

(71) Applicant: HONDA MOTOR CO., LTD., Tokyo (JP)

(72) Inventors: Hiroshi Sugihara, Wako (JP); Atsushi Sekiguchi, Wako (JP); Yuki Matsuura, Wako (JP); Eisuke Soma, Wako (JP); Wataru Endo, Wako (JP); Ryosuke Tanaka, Wako (JP); Toshikatsu Kuramochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/281,275

(22) PCT Filed: Oct. 5, 2018

(86) PCT No.: PCT/JP2018/037392
§ 371 (c)(1),
(2) Date: Mar. 30, 2021

(87) PCT Pub. No.: WO2020/070878
PCT Pub. Date: Apr. 9, 2020

(65) Prior Publication Data
US 2022/0005470 A1   Jan. 6, 2022

(51) Int. Cl.
*G10L 15/22* (2006.01)
*B60R 11/02* (2006.01)
(Continued)

(52) U.S. Cl.
CPC .......... *G10L 15/22* (2013.01); *B60R 11/0217* (2013.01); *B60R 11/0247* (2013.01);
(Continued)

(58) Field of Classification Search
CPC ................. G10L 15/22; G10L 15/1815; G10L 2015/223; G10L 13/00; G10L 15/30; G10L 15/26; G10L 13/02
See application file for complete search history.

(56) References Cited

U.S. PATENT DOCUMENTS 10,198,877 B1 * 2/2019 Maltsev ................. H04L 67/52
2009/0129607 A1   5/2009 Yamamoto
(Continued)

FOREIGN PATENT DOCUMENTS

| CN | 101437064 | 5/2009 |
| JP | 2000-020888 | 1/2000 |

(Continued)

OTHER PUBLICATIONS

International Search Report and Written Opinion for International Application No. PCT/JP2018/037392 dated Nov. 13, 2018, 7 pages.
(Continued)

*Primary Examiner* — Mark Villena
(74) *Attorney, Agent, or Firm* — AMIN, TUROCY & WATSON, LLP

(57) ABSTRACT

An agent device includes a microphone configured to collect a speech sound inside a vehicle cabin, a speaker configured to output a speech sound inside the vehicle cabin, and a plurality of agent function elements having different functions. Each of the plurality of agent function elements generates a speech sound of an agent that speaks to an occupant of a vehicle on the basis of a meaning of the speech sound collected by the microphone, causes the speaker to output the generated speech sound of the agent. The agent function element serving as a main agent that has a dialogue with the occupant is switched on the basis of content of the speech sound collected by the microphone.

9 Claims, 11 Drawing Sheets

(51) Int. Cl.
  *B60R 16/037* (2006.01)
  *H04R 1/40* (2006.01)
(52) U.S. Cl.
  CPC ......... *B60R 16/0373* (2013.01); *H04R 1/406* (2013.01); *H04R 2499/13* (2013.01)

(56) References Cited

U.S. PATENT DOCUMENTS

| | | | | |
|---|---|---|---|---|
| 2010/0127847 | A1* | 5/2010 | Evans | G06F 3/04886 345/173 |
| 2017/0235361 | A1* | 8/2017 | Rigazio | G10L 15/22 715/710 |
| 2018/0093673 | A1* | 4/2018 | Yuhara | B60W 50/10 |
| 2019/0171409 | A1* | 6/2019 | Boulanger | H04H 60/35 |
| 2019/0196779 | A1* | 6/2019 | Declerck | G10L 15/08 |
| 2019/0311713 | A1* | 10/2019 | Talwar | G06F 40/30 |
| 2019/0342358 | A1* | 11/2019 | Barvesten | G06F 3/0481 |
| 2020/0302925 | A1* | 9/2020 | Shah | G06F 3/167 |
| 2020/0312317 | A1* | 10/2020 | Kothari | H04L 67/125 |
| 2020/0342866 | A1* | 10/2020 | Casado | G10L 15/183 |
| 2021/0117150 | A1* | 4/2021 | Hussain | H04L 43/0817 |

FOREIGN PATENT DOCUMENTS

| | | |
|---|---|---|
| JP | 2002-163054 | 6/2002 |
| JP | 2002-199499 | 7/2002 |
| JP | 2006-188098 | 7/2006 |
| JP | 2006-284454 | 10/2006 |
| JP | 2006-335231 | 12/2006 |

OTHER PUBLICATIONS

Japanese Office Action for Japanese Patent Application No. 2020-551052 dated Feb. 8, 2022.

Chinese Office Action for Chinese Patent Application No. 201880098254.8 dated May 31, 2023.

* cited by examiner

172

| FUNCTION INFORMATION | AGENT INFORMATION | | | |
|---|---|---|---|---|
| | AGENT A | AGENT B | AGENT C | ... |
| IN-VEHICLE EQUIPMENT CONTROL | 1 | 0 | 0 | ... |
| SHOP/STORE SEARCH | 1 | 1 | 1 | ... |
| ROUTE GUIDANCE | 1 | 1 | 0 | ... |
| TRAFFIC INFORMATION NOTIFICATION | 0 | 1 | 0 | ... |
| RADIO CONTROL | 0 | 1 | 0 | ... |
| HOUSEHOLD EQUIPMENT CONTROL | 0 | 0 | 1 | ... |
| PRODUCT ORDERING | 0 | 0 | 1 | ... |
| ... | ... | ... | ... | ... |

FIG. 6

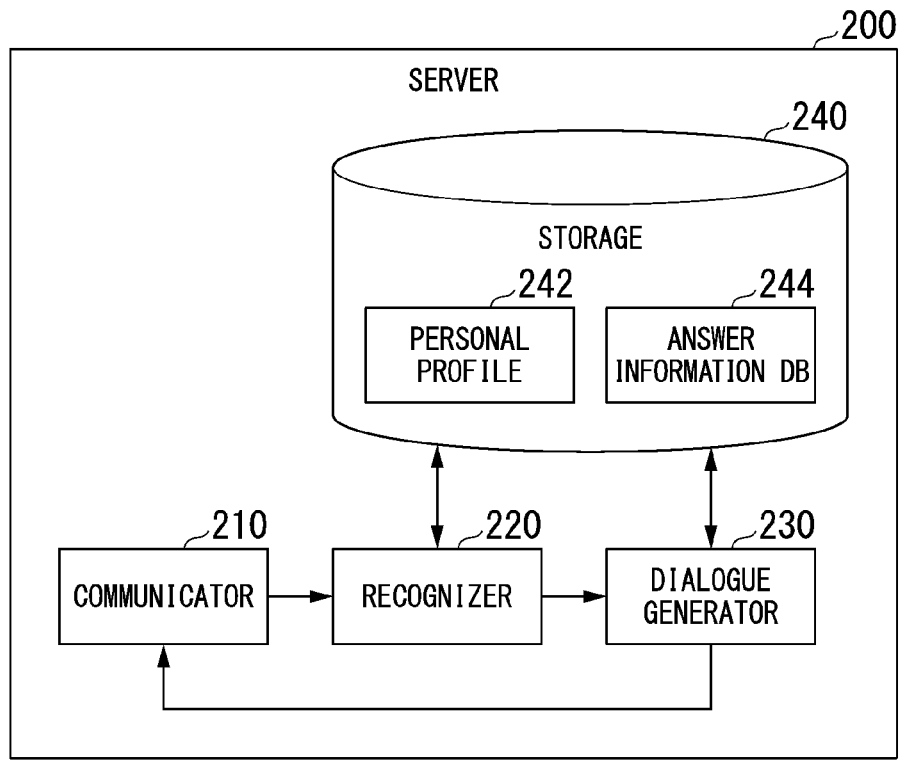

| COMMAND INFORMATION | CONTROL CONTENT |
|---|---|
| ACTIVATION OF AIR CONDITIONER | EQUIPMENT CONTROL:AIR CONDITIONER IS ACTIVATED.<br>SPEECH SOUND CONTROL: "AIR CONDITIONER HAS BEEN ACTIVATED."<br>DISPLAY CONTROL:TEMPERATURE WITHIN VEHICLE CABIN AND SET TEMPERATURE ARE DISPLAYED |
| STOPPING OF AIR CONDITIONER | EQUIPMENT CONTROL:AIR CONDITIONER IS STOPPED.<br>SPEECH SOUND CONTROL: "AIR CONDITIONER HAS BEEN STOPPED." |
| TUNNING ON OF VEHICLE INTERIOR LIGHT | EQUIPMENT CONTROL:VEHICLE INTERIOR LIGHT IS TURNED ON.<br>SPEECH SOUND CONTROL: "VEHICLE INTERIOR LIGHT HAS BEEN TURNED ON. |
| WHAT IS DISTANCE TO STATION A? | SPEECH SOUND CONTROL: "*** [km] FROM HERE."<br>DISPLAY CONTROL:IMAGE OF ROUTE TO STATION A IS DISPLAYED. |
| WHAT IS NEARBY RESTAURANT? | SPEECH SOUND CONTROL: "NUMBER OF NEARBY RESTAURANTS IS ***."<br>DISPLAY CONTROL:IMAGE OF LIST OF RESTAURANTS IS DISPLAYED. |
| ... | ... |

| COMMAND INFORMATION | CONTROL CONTENT |
|---|---|
| WHAT IS DISTANCE TO STATION A? | SPEECH SOUND CONTROL: "*** [km] FROM HERE."<br>DISPLAY CONTROL: IMAGE OF ROUTE TO STATION A IS DISPLAYED. |
| WHAT IS NEARBY RESTAURANT? | SPEECH SOUND CONTROL: "NUMBER OF NEARBY RESTAURANTS IS ***."<br>DISPLAY CONTROL: IMAGE OF LIST OF RESTAURANTS IS DISPLAYED. |
| TURN ON RADIO | APPLICATION CONTROL: RADIO APPLICATION IS EXECUTED |
| ... | ... |

FIG. 9

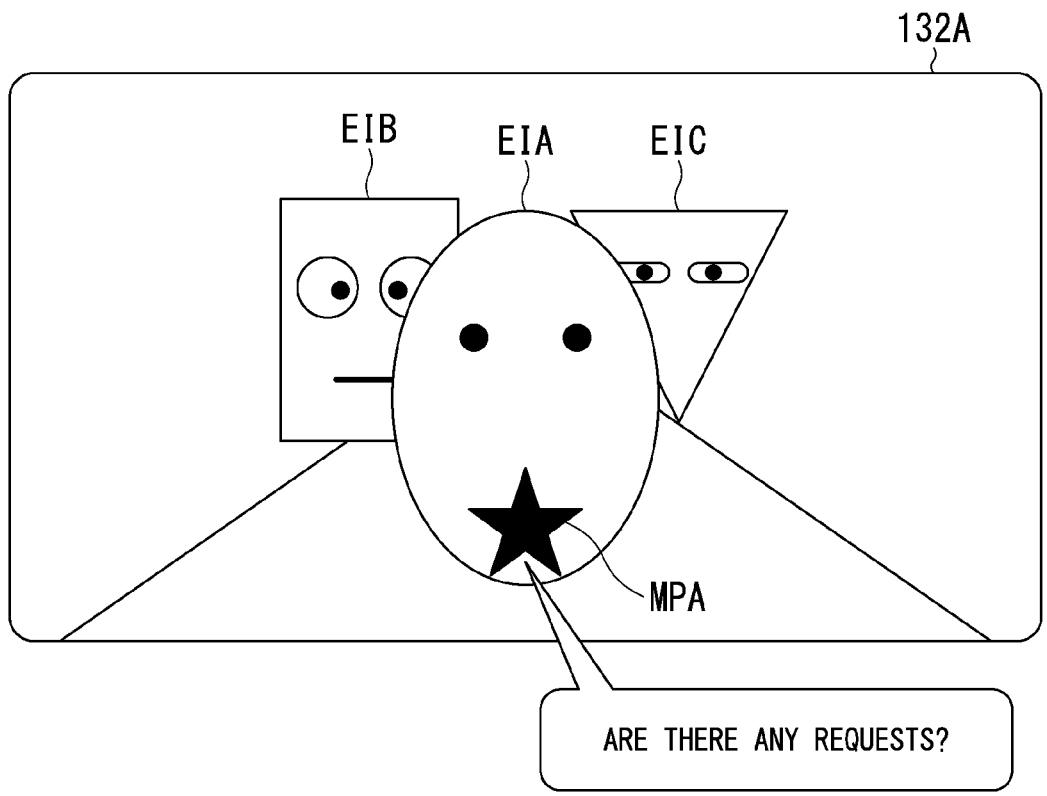

AGENT DEVICE, AGENT CONTROL METHOD, AND PROGRAM

TECHNICAL FIELD

The present invention relates to an agent device, an agent control method, and a program.

BACKGROUND ART

Conventionally, technology related to an agent that provides information about driving assistance, vehicle control, other applications, and the like according to a request from an occupant of a vehicle while having a dialogue with the occupant is known (see, for example, Patent Literature 1).

CITATION LIST

Patent Literature

[Patent Literature 1]
Japanese Unexamined Patent Application, First Publication No. 2006-335231

SUMMARY OF INVENTION

Technical Problem

However, because there may be various requests from an occupant, it may not be possible to cope with the requests with only one agent. Also, even if a plurality of agents are used, sufficient cooperation between the agents may be difficult because the other agent devices are stopped when one agent called by the occupant is activated. As a result, it may not be possible to provide the occupant with appropriate assistance.

Aspects of the present invention have been made in view of the above circumstances and an objective of the present invention is to provide an agent device, an agent control method, and a program capable of providing an occupant with more appropriate assistance.

Solution to Problem

An agent device, an agent control method, and a non-transitory computer-readable storage medium according to the present invention adopt the following configurations.

(1): According to an aspect of the present invention, there is provided an agent device including: a microphone configured to collect a speech sound inside a vehicle cabin; a speaker configured to output a speech sound inside the vehicle cabin; and a plurality of agent function elements having different functions, wherein each of the plurality of agent function elements generates a speech sound of an agent that speaks to an occupant of a vehicle on the basis of a meaning of the speech sound collected by the microphone and causes the speaker to output the generated speech sound of the agent, and wherein the agent function element serving as a main agent that has a dialogue with the occupant is switched on the basis of content of the speech sound collected by the microphone.

(2): In the above-described aspect (1), each of the plurality of agent function elements causes the speaker to output the speech sound of the agent so that a sound image of the generated speech sound of the agent is localized at a predetermined position.

(3): In the above-described aspect (1) or (2), the agent device further includes a master agent function element configured to switch the main agent that has a dialogue with the occupant on the basis of the meaning of the speech sound collected by the microphone, wherein one of the plurality of agent function elements is switched to the main agent that has a dialogue with the occupant through switching control of the master agent function element.

(4): In the above-described aspect (3), the master agent function element and one of the plurality of agent function elements operate integrally.

(5): In the above-described aspect (3) or (4), the agent device further includes a storage configured to store function information related to a function capable of being executed by each of the plurality of agent function elements, wherein the master agent function element switches the agent function element to an agent function element capable of executing a function corresponding to the meaning of the speech sound with reference to the function information on the basis of the meaning of the speech sound.

(6): In any one of the above-described aspects (3) to (5), equipment mounted in the vehicle is controlled by a specific agent function element among the plurality of agent function elements.

(7): In any one of the above-described aspects (3) to (5), the agent device further includes a display configured to display an image, wherein the plurality of agent function elements generate images of anthropomorphic agents that communicate with the occupant, and wherein the master agent function element causes the display to display the images of the agents generated by the plurality of agent function elements and causes a display form of the image of the agent to be changed when a main agent that has a dialogue with the occupant is switched.

(8): In any one of the above-described aspects (3) to (7), a plurality of microphones are provided inside the vehicle cabin and the plurality of microphones are installed at positions within a predetermined distance inside the vehicle cabin.

(9): In the above-described aspect (8), one of inputs of the plurality of microphones is assigned to the master agent function element.

(10): In the above-described aspect (8) or (9), a microphone assigned to the master agent function element has higher performance than other microphones.

(11): In any one of the above-described aspects (8) to (10), the master agent function element inputs a speech sound from the assigned microphone all the time.

(12): In any one of the above-described aspects (8) to (11), speech sounds collected by the plurality of microphones are able to be input to a speech sound input interface of the master agent function element.

(13): According to yet another aspect of the present invention, there is provided an agent control method including: causing, by a computer, each of a plurality of agent function elements having different functions to generate a speech sound of an agent that speaks to an occupant of a vehicle on the basis of a meaning of a speech sound collected by a microphone configured to collect the speech sound inside a vehicle cabin; and causing, by the computer, a speaker configured to output a speech sound inside the vehicle cabin to output the generated speech sound of the agent, wherein the agent function element serving as a main agent that has a dialogue with the occupant is switched on the basis of content of the speech sound collected by the microphone.

(14): According to still another aspect of the present invention, there is provided a non-transitory computer-readable storage medium that stores a program to be executed by a computer to perform at least: cause each of a plurality of agent function elements having different functions to generate a speech sound of an agent that speaks to an occupant of a vehicle on the basis of a meaning of a speech sound collected by a microphone configured to collect the speech sound inside a vehicle cabin; and cause a speaker configured to output a speech sound inside the vehicle cabin to output the generated speech sound of the agent, wherein the agent function element serving as a main agent that has a dialogue with the occupant is switched on the basis of content of the speech sound collected by the microphone.

Advantageous Effects of Invention

According to (1) to (14), it is possible to provide an occupant with more appropriate assistance.

BRIEF DESCRIPTION OF DRAWINGS

FIG. 6 is a diagram showing an example of a functional configuration of a server 200.

FIG. 7 is a diagram showing an example of content of an answer information DB 244A provided in a server 200A.

FIG. 8 is a diagram showing an example of content of an answer information DB 244B provided in a server 200B.

FIG. 9 is a diagram for describing a process executed by an agent device 100 in a first scene.

DESCRIPTION OF EMBODIMENTS

Hereinafter, embodiments of an agent device, an agent control method, and a program according to the present invention will be described with reference to the drawings. Also, hereinafter, an agent device installed in a vehicle (hereinafter referred to as a vehicle M) and having an interactive agent function will be described as an example of the agent device. For example, the interactive agent function is a function of providing an occupant with assistance by providing various types of information based on a request from the occupant, controlling in-vehicle equipment, or the like while having a dialogue with the occupant of the vehicle M. For example, the interactive agent function is implemented using a natural language function (a process of understanding a structure and meaning of text), a dialogue control process, a search process, and the like in an integrated manner in addition to a speech sound recognition process of recognizing a speech sound of the occupant (a process of generating text from a speech sound). Some or all of these processes are implemented by artificial intelligence (AI) technology. Some or all components for performing these processes may be provided in a server (an external device) or the like that can communicate with the vehicle M.

First Embodiment

[Overall Configuration]

Figure 1:
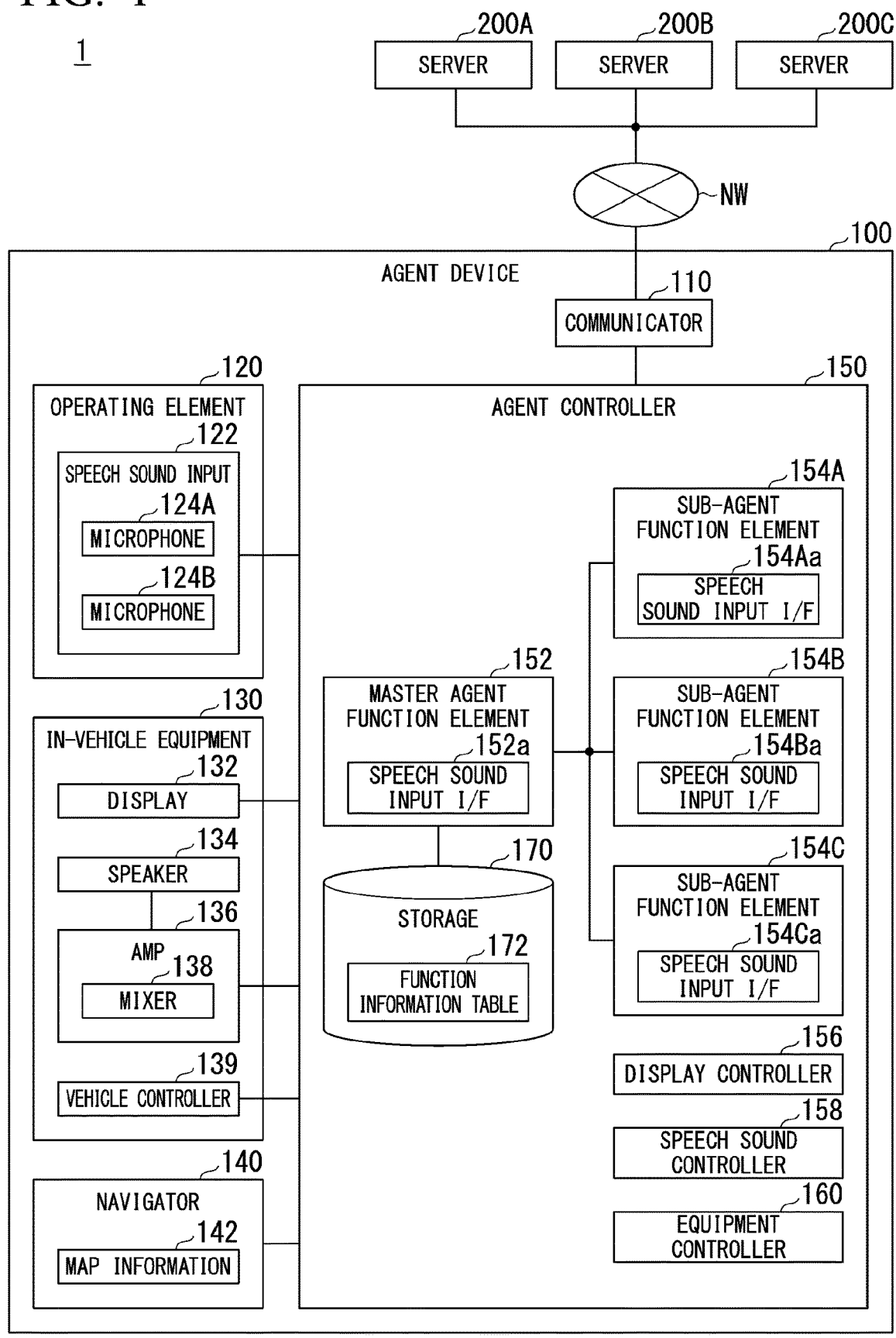
FIG. 1 is a configuration diagram of an agent system 1 including an agent device according to a first embodiment.

FIG. 1 is a configuration diagram of an agent system 1 including an agent device according to a first embodiment. The agent system 1 includes, for example, an agent device 100 and a server 200. The agent device 100 and the server 200 are connected in a state in which data can be transmitted and received by, for example, a network NW such as the Internet, a wide area network (WAN), or a local area network (LAN). Servers 200A to 200C shown in FIG. 1 correspond to, for example, sub-agent function elements 154A to 154C to be described below. Hereinafter, when each of the servers 200A to 200C is not distinguished, it will be referred to as a "server 200." The same is true for other names The agent device 100 has a dialogue with the occupant of the vehicle M, makes a request to the server 200 with respect to a request such as a question based on a speech sound or the like from the occupant, and presents an answer obtained from the server 200 to the occupant in a predetermined output form, thereby providing assistance for the occupant. Although the occupant is, for example, an occupant sitting in a driver's seat (hereinafter referred to as a driver) in the following description, the occupant may also be an occupant (a passenger) sitting in a passenger seat or a rear seat. The predetermined output form is, for example, a form of a speech sound output, an image output, or the like. Also, the agent device 100 executes control on in-vehicle equipment, household equipment, or the like in response to a speech sound instruction from the occupant.

The agent device 100 includes, for example, a communicator 110, an operating element 120, an in-vehicle equipment 130, a navigator 140, and an agent controller 150. These devices and equipment are connected to each other through multiplex communication lines such as controller area network (CAN) communication lines, serial communication lines, wireless communication networks, and the like. Also, the configuration shown in FIG. 1 is merely an example and some components may be omitted or other components may be added.

For example, the communicator 110 communicates with the server 200, another vehicle, and a terminal device possessed by the occupant via the network NW using a cellular network, a Wi-Fi network, Bluetooth (registered trademark), dedicated short range communication (DSRC), or the like. Communication with the server 200 is mediated by the network NW. The communicator 110 transmits, for example, information including a speech sound input from the agent controller 150 to the server 200. Also, the communicator 110 receives dialogue information and output control information generated by the server 200. The dialogue information includes, for example, information related to speech sound output control to be described below. The output control information includes, for example, information related to display control of images and the like, information related to control of various types of equipment, and the like.

The operating element 120 receives an operation from the occupant. The operating element 120 includes, for example, a speech sound input 122. The speech sound input 122 collects a speech sound of the occupant present within the vehicle cabin. The speech sound input 122 includes, for example, a plurality of microphones 124. The plurality of microphones 124 may be microphones having different performances. Microphone performances include, for example, sensitivity, directivity, a frequency property, and an intensity. Hereinafter, two microphones 124A and 124B will be used for description and it is assumed that the microphone 124A has higher performance than the microphone 124B. A speech sound (a speech sound stream) collected by each microphone is input to a speech sound input interface (a speech sound input I/F) 152a provided in the master agent function element 152 to be described below. Also, the operating element 120 may include switches, buttons, keys, a touch panel, and the like.

The in-vehicle equipment 130 is an example of a target which is controlled by the agent controller 150. The in-vehicle equipment 130 includes, for example, a display 132, a speaker 134, an amplifier (AMP) 136, a mixer 138, and vehicle controller 139.

The display 132 is installed near the front of the occupant sitting in the seat within the vehicle cabin. Also, the speaker 134 is installed near the seat within the vehicle cabin or near the display 132. A plurality of displays 132 and a plurality of speakers 134 may be installed within the vehicle cabin.

Figure 2:
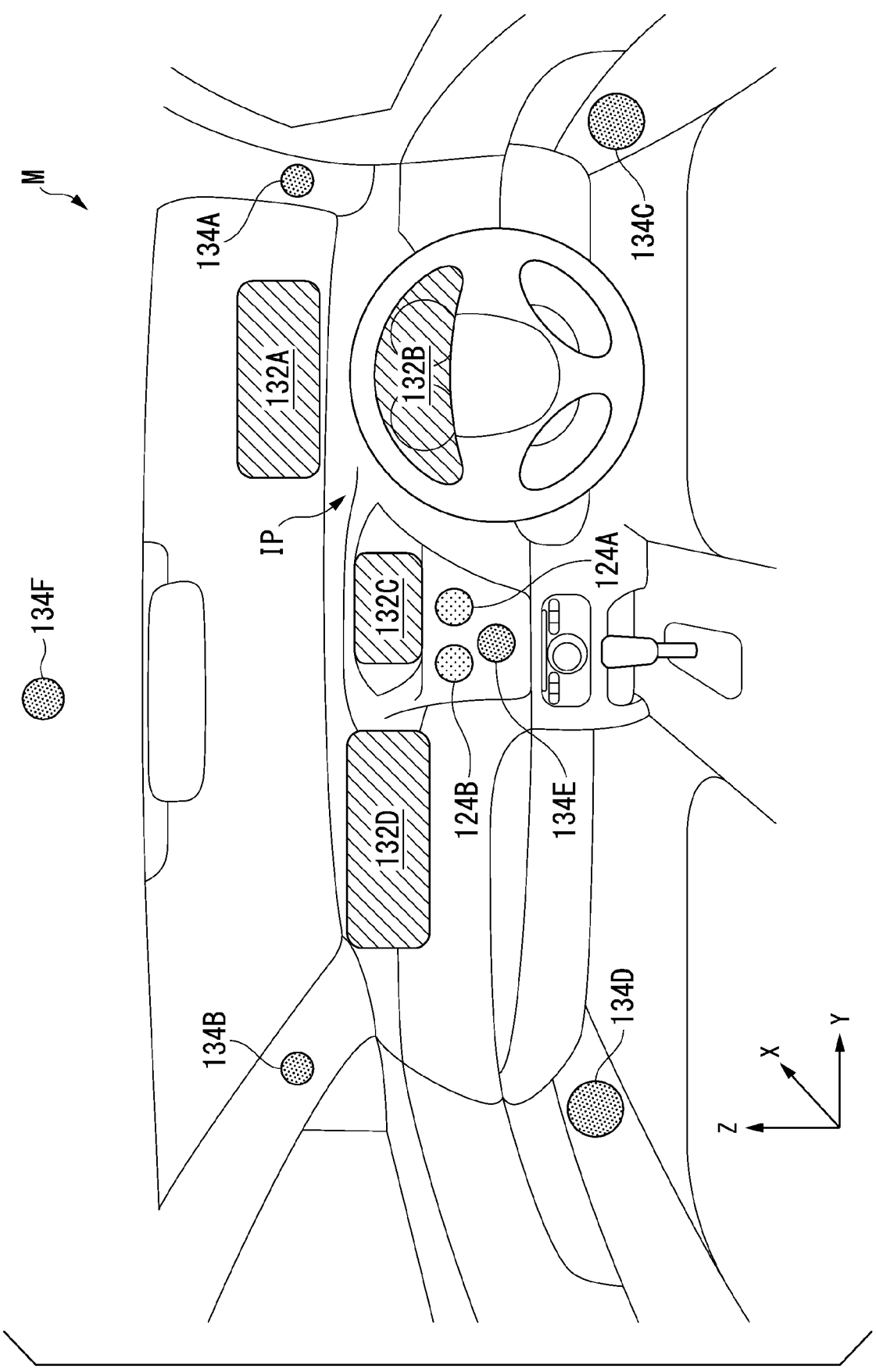
FIG. 2 is a diagram schematically showing a microphone, a display, and a speaker installed in a vehicle M.

FIG. 2 is a diagram schematically showing a microphone, a display, and a speaker installed in the vehicle M. The microphones 124A and 124B, displays 132A to 132D, and speakers 134A to 134F are installed in the vehicle cabin of the vehicle M shown in FIG. 2.

The microphones 124A and 124B are installed at any positions on an instrument panel IP within a predetermined distance. When the microphones 124A and 124B are installed at positions within a predetermined distance, substantially similar speech sounds can be input from both the microphones 124A and 124B. Also, the microphones 124A and 124B may be installed on the steering wheel or the seat.

The display 132A is, for example, a head-up display (HUD) device. The HUD device is a device for enabling an image superimposed on scenery to be visually recognized. As an example, the HUD device is a device for allowing the driver to visually recognize a virtual image by projecting light including an image onto a front windshield or a combiner of the vehicle M. For example, an image corresponding to a navigation process to be executed by the navigator 140, an image generated by the agent controller 150, or the like is displayed on the display 132A.

The display 132B is provided near the front of the driver's seat (for example, a seat closest to the steering wheel) on the instrument panel IP and is installed at a position where the driver can perform visual recognition from the steering wheel gap or through the steering wheel. The display 132B is, for example, a liquid crystal display (LCD) or an organic electro luminescence (EL) display device. The display 132B displays, for example, an image of a speed of the vehicle M, an engine speed, the remaining amount of fuel, a radiator water temperature, a travel distance, or other information, an image generated by the agent controller 150, or the like.

The display 132C is installed near the center of the instrument panel IP. For example, similar to the display 132B, the display 132C is, for example, an LCD, an organic EL display device, or the like. For example, an image corresponding to a navigation process executed by the navigator 140, an image generated by the agent controller 150, and the like are displayed on the display 132C. The display 132C may display a television program, perform DVD reproduction, or display content such as a downloaded movie.

The display 132D is provided near the front of the passenger seat (a seat adjacent to the driver's seat) in the instrument panel IP. The display 132D displays, for example, a content image of a television program, a movie downloaded from the server 200, or the like, an image generated based on execution of another application, an image generated by the agent controller 150, and the like. Also, in addition to the above-described display, a display (an electronic mirror) for displaying an image of the side/rear of the vehicle M acquired by an external camera may be installed in the vehicle cabin.

For example, the agent controller 150 causes at least one of the displays 132A to 132D to display a result of a response to a request from the occupant. For example, when a result of an answer to the driver's question is displayed, the agent controller 150 can cause the display 132A or 132B to display a response result so that the driver can easily view the response result while monitoring the front of the vehicle. Also, the agent controller 150 can enable other passengers as well as the driver to easily recognize the response result by causing the displays 132C and 132D to display the response result. For example, the display 132 which performs a display process may be determined on the basis of content of the answer result or a state of a vehicle (a state in which the vehicle is traveling or stopped) or may be determined on the basis of an instruction of the occupant.

The speakers 134A and 134B are installed, for example, on left and right front window pillars (so-called A-pillars) of the vehicle M. Also, the speaker 134C is installed in the lower part of the driver's seat side door and the speaker 134D is installed in the lower part of the passenger seat side door. The speaker 134E is installed near the display 132C, i.e., near the center of the instrument panel IP. The speaker 134F is installed near the center of the ceiling within the vehicle cabin.

Figure 3:
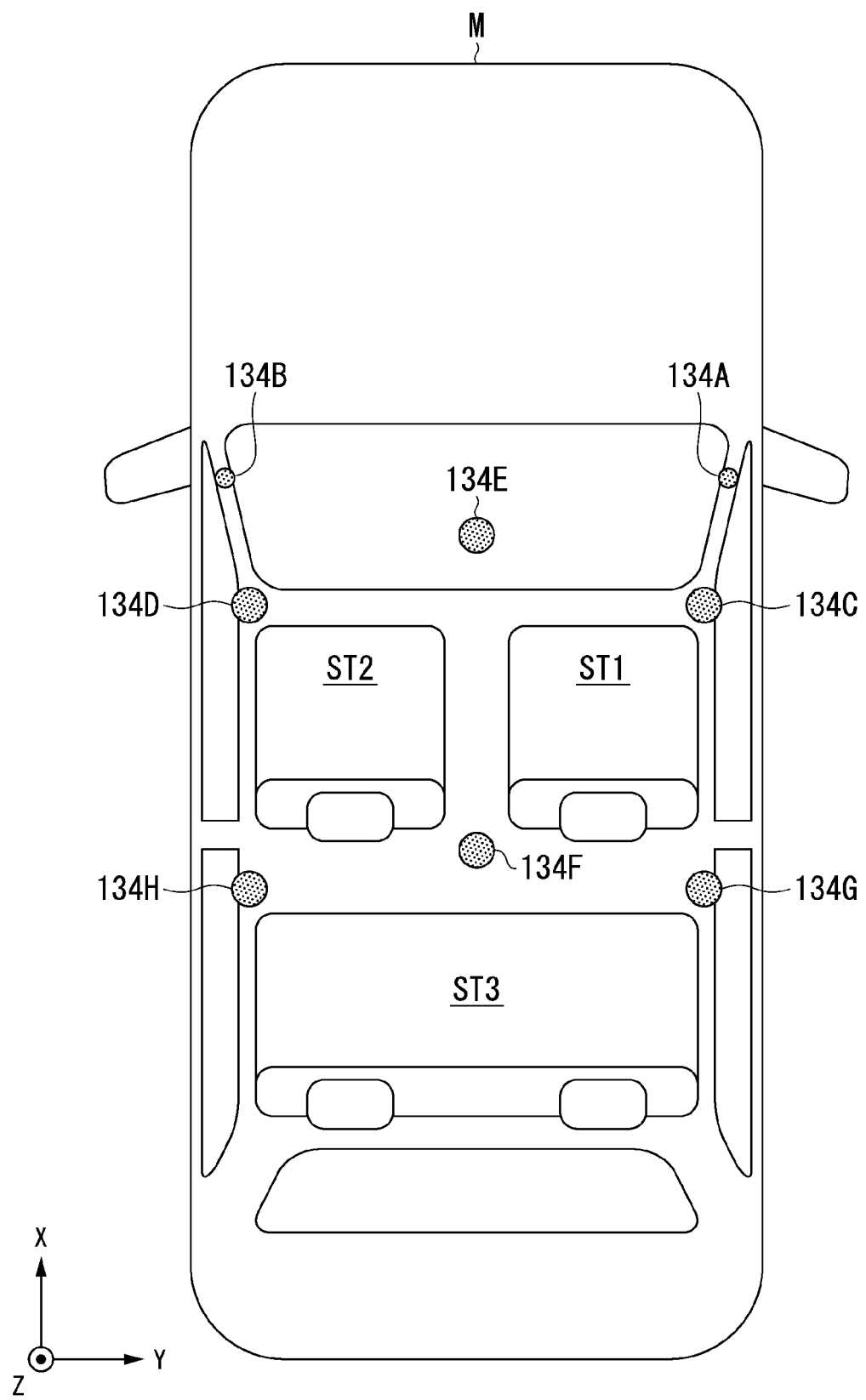
FIG. 3 is a diagram for describing a position of a speaker near a rear seat.

Also, the vehicle M may be provided with a speaker near the rear seat. FIG. 3 is a diagram for describing the position of the speaker near the rear seat. In the example of FIG. 3, in addition to the speakers 134A to 134F shown in FIG. 2, the speakers 134G and 134H are provided near a rear seat ST3 installed behind the driver's seat ST1 and a passenger seat ST2. Specifically, the speakers 134G and 134H are provided in the lower parts of the left and right direction doors. Also, the speaker 134 may be provided on a window pillar (a so-called B-pillar) provided between the front door and the rear door of the vehicle M or may be provided behind the rear seat.

The AMP 136 adjusts a volume of a speech sound which is output from the speaker 134 according to control of the speech sound controller 158. For example, the AMP 136 can adjust the speech sound between 0 and 100% with respect to a reference speech sound volume (a maximum intensity). Also, for example, the AMP 136 includes a mixer 138. The mixer 138 has a function of combining a plurality of input speech sounds. Also, the mixer 138 has a function of distributing speech sounds to be output to speakers when there are a plurality of speakers 134. The agent controller 150 causes a speech sound to be output from at least one of the speakers 134A to 134H.

The vehicle controller 139 is a device for controlling a state of the vehicle M or the vehicle cabin. For example, the vehicle controller 139 is an air conditioner, a lighting device for turning on or off a vehicle interior light, a seat drive device for automatically changing a seat position and a reclining angle, or a power window unit for opening or closing a side windshield. Also, the in-vehicle equipment 130 may include a navigator 140.

The navigator 140 identifies a position of the vehicle M on the basis of, for example, a signal received from a global navigation satellite system (GNSS) satellite. Also, the navigator 140 determines a route from the identified position of the vehicle M (or any input position) to a destination input by the occupant using the operating element 120 or the display 132 (hereinafter referred to as a route on a map) with reference to the map information 142. For example, the map information 142 is information in which a road shape is expressed by a link indicating a road and nodes connected by the link. The map information 142 may include a curvature of the road, point of interest (POI) information, or the like. Also, for example, the map information 142 may include information about the center of a lane, information about a boundary of a lane, information about a type of lane, and the like. Also, the map information 142 may include road information, traffic regulation information, address information (an address and a postal code), facility information, telephone number information, and the like. The map information 142 may be updated at any time by the communicator 110 communicating with another device.

Also, the navigator 140 may be implemented by, for example, the function of a terminal device such as a smartphone or a tablet terminal possessed by the occupant. Also, the navigator 140 may transmit a current position and a destination to the server 200 or the navigation server via the communicator 110 and acquire a route equivalent to the route on the map from the server 200 or the navigation server. Also, the navigator 140 may implement the above-described function of the navigator 140 according to a function of a navigation application which is executed by the agent controller 150. Also, the navigator 140 may provide route guidance using the display 132 displaying a map image or the speaker 134 outputting a speech sound on the basis of the route on the map.

[Agent Controller]

The agent controller 150 includes, for example, a master agent function element 152, a plurality of sub-agent function elements (an example of an agent function elements) 154, a display controller 156, a speech sound controller 158, an equipment controller 160, and a storage 170. For example, these components are implemented by a computer processor such as a central processing unit (CPU) executing a program (software). Some or all of these components may be implemented, for example, by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in the storage 170 or may be stored in a removable storage medium such as a DVD or a CD-ROM and installed in the storage 170 when the storage medium is mounted in a drive device. Hereinafter, it is assumed that three sub-agent function elements 154A to 154C are used as an example of the plurality of sub-agent function elements 154.

The storage 170 is implemented by, for example, an HDD, a flash memory, an electrically erasable programmable read only memory (EEPROM), a read only memory (ROM), a random access memory (RAM), or the like. The storage 170 stores, for example, a function information table 172, a program which is read and executed by a processor, and other information. Content within the function information table 172 will be described below.

[Master Agent Function Element]

The master agent function element 152 includes a speech sound input interface 152a capable of inputting speech sounds from microphones 124A and 124B. Also, the sub-agent function elements 154A to 154C include speech sound input interfaces 154Aa to 154Ca capable of inputting a speech sound from the microphone 124B. That is, the microphone 124A is assigned to the speech sound input interface 152a and the microphone 124B is assigned so that switching to any one of the master agent function element 152 and the sub-agent function elements 154A to 154C is enabled in accordance with a processing state for the occupant's request. By assigning the microphone 124A having higher performance than the microphone 124B to the master agent function element 152, the master agent function element 152 can input a speech sound having speech sound quality higher than that of the microphone 124B.

The master agent function element 152 recognizes the meaning of a speech sound from the speech sound (a speech sound stream) input by the speech sound input interface 152a. Specifically, first, the master agent function element 152 detects a speech sound section on the basis of amplitude and zero intersection of a speech sound waveform in the input speech sound stream. Also, the master agent function element 152 may perform section detection based on speech sound identification and non-speech-sound identification based on a Gaussian mixture model (GMM) in units of frames.

Next, the master agent function element 152 recognizes the speech sound in the detected speech sound section and converts the recognized speech sound into text information. The master agent function element 152 executes natural language processing on the text information obtained through the conversion and recognizes the meaning of the text information. The natural language processing includes morphological analysis, syntactic analysis, semantic analysis, context analysis, and the like. In the morphological analysis, for example, the text information is divided into units of the smallest expression elements which are semantic, and a part of speech and the like for each divided unit (a morpheme) are analyzed. In the syntactic analysis, for example, the structure of a sentence is analyzed on the basis of the morpheme obtained through the morphological analysis. In the semantic analysis, for example, a semantic group is determined on the basis of a syntax obtained through the syntactic analysis. In the context analysis, for example, sentence-by-sentence meanings are recognized.

Next, the master agent function element 152 recognizes a word or a command on the basis of the recognized meaning. For example, the master agent function element 152 recognizes a word for calling any agent (interactive agent) such as an input speech sound "Hey!" or "Hello!" or recognizes a word (for example, a wake word) for designating and calling an agent implemented by each of the sub-agent function elements 154A to 154C.

Also, the master agent function element 152 generates a command corresponding to the recognized meaning. For example, when the meaning such as "Turn on the air conditioner" or "Please turn on the air conditioner" is recognized as the recognition result, the master agent function element 152 generates a command obtained through the replacement with the standard text information "activation of the air conditioner." Thereby, even if there is variation in text in the speech sound of the request, it is possible to easily execute the control according to the request. Also, the master agent function element 152 may recognize a meaning of the text information using an artificial intelligence process such as a machine learning process using a probability or may generate a command based on the recognition result.

Also, the master agent function element 152 determines a sub-agent that has a dialogue with the occupant on the basis of the recognized word or command. For example, when a word that calls any agent has been recognized, the agent is determined to be a predesignated agent (for example, agent A implemented by the sub-agent function element 154A). Also, when a word that designates a specific agent has been recognized, the master agent function element 152 determines the agent designated by the recognized word. Also, the master agent function element 152 may determine an agent capable of implementing the function associated with the command as an agent that has a dialogue with the occupant with reference to the function information table 172 stored in the storage 170 on the basis of the recognized command.

Figures 4, 5:
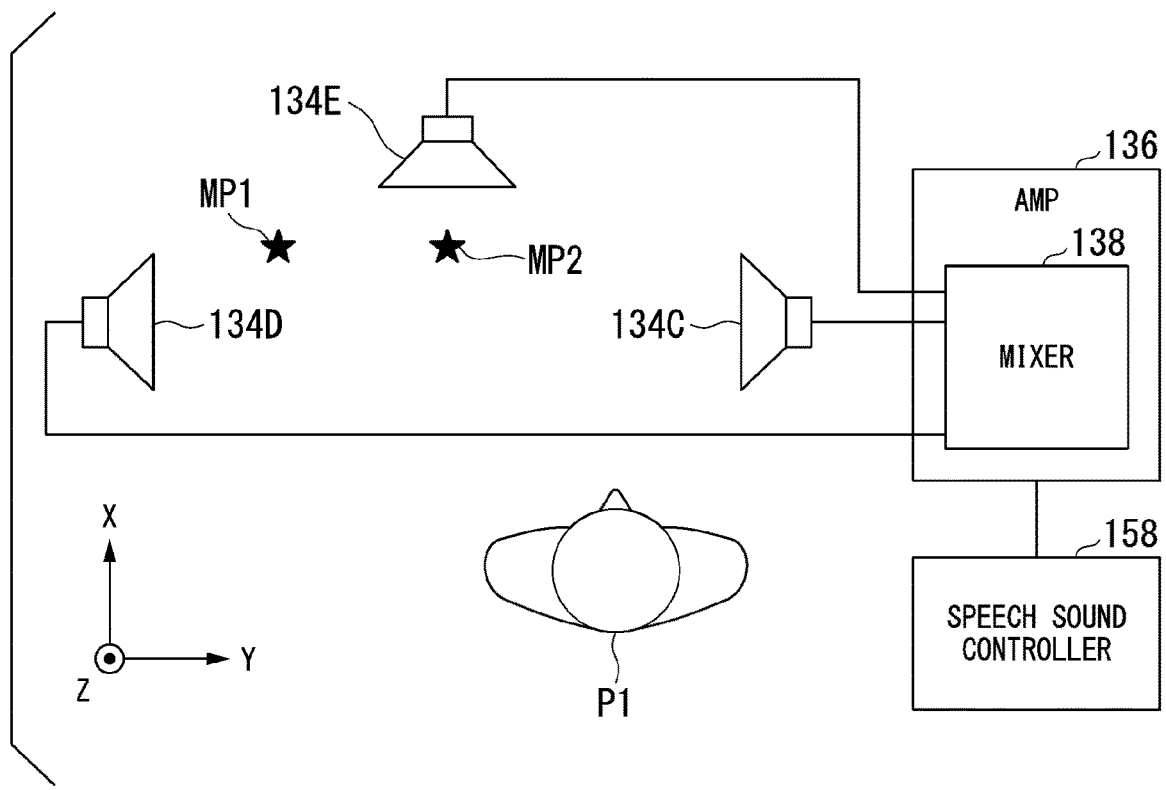
FIG. 4 is a diagram showing an example of content of a function information table 172.
FIG. 5 is a diagram for describing the movement of a position where a sound image is localized.

FIG. 4 is a diagram showing an example of content of the function information table 172. In the function information table 172, the agent identification information is associated with the function information. The function information includes, for example, in-vehicle equipment control, a shop/store search, route guidance, traffic information notification, radio control, household equipment control, and product ordering. Also, the agent information includes, for example, agents A to C implemented by the sub-agent function elements 154A to 154C. Also, although "1" is stored in the function that can be implemented by the agent and "0" is stored in the function that cannot be implemented in the example of FIG. 4, other identification information may be used.

For example, when the recognized command is "activation of the air conditioner," the master agent function element 152 determines an agent capable of executing in-vehicle equipment control, which is control corresponding to the command, with reference to the function information table 172. In the example of FIG. 4, the master agent function element 152 acquires that the agent capable of starting the air conditioner is agent A and determines agent A that has a dialogue with the occupant. Also, in the case of a function that can be executed by a plurality of agents, such as the shop/store search, the master agent function element 152 may determine an agent on the basis of a priority predetermined for each function.

Also, when a wake word for calling a specific agent has been recognized, the master agent function element 152 may determine an agent that has a dialogue with the occupant on the basis of the wake word.

The master agent function element 152 enables the sub-agent function element 154 corresponding to the determined agent to have a dialogue with the occupant. Thus, the master agent function element 152 assigns the speech sound from the microphone 124B to the speech sound input interface of the sub-agent function element 154 that has a dialogue with the occupant. Thereby, the sub-agent function element 154 enabled to have a dialogue with the occupant by the master agent function element 152 can acquire a request from the occupant or have a dialogue with the occupant on the basis of a speech sound from the microphone 124B input through the speech sound input interface.

Also, the master agent function element 152 inputs the speech sound collected by the microphone 124A all the time even if the predetermined sub-agent function element 154 can have a dialogue with the occupant. Thereby, for example, the master agent function element 152 can ascertain content of the dialogue between the sub-agent function element 154A and the occupant, select another sub-agent function element 154 from which a more appropriate answer is likely to be obtained, and perform control such as switching to the other sub-agent function element 154 that has been selected. Thereby, the cooperation between a plurality of agents can be improved and more appropriate assistance for the occupant can be implemented.

Also, because the master agent function element 152 can input speech sounds from both the microphones 124A and 124B when the sub-agent function element 154 cannot have a dialogue with the occupant, it is possible to input a speech sound with higher performance. Also, the master agent function element 152 can recognize from which direction the speech sound is being heard within the vehicle cabin on the basis of a phase difference between the speech sounds of the microphones 124A and 124B.

Also, the master agent function element 152 adjusts an output position of the speech sound output by each of the sub-agent function elements 154A to 154C, a display position of an image, and the like. Details of adjustment of a speech sound output position and an image display position in the master agent function element 152 will be described below.

[Sub-Agent Function Element]

The sub-agent function element 154 transmits information including a speech sound input from the speech sound input interface to the server 200 via the network NW and acquires dialogue information or output control information corresponding to the transmitted speech sound. Also, the sub-agent function element 154 may transmit information about the state of the vehicle M (for example, the position of the vehicle M and the surrounding environment of the vehicle M) when the information including the input speech sound is transmitted to the server 200.

The sub-agent function element 154 causes the speech sound controller 158 to generate a speech sound and execute speech sound control when the acquired dialogue information includes the speech sound control. Also, the sub-agent function element 154 causes the display controller 156 to execute image generation and display control when the acquired output control information includes display control. Also, the sub-agent function element 154 causes the equipment controller 160 to execute control for the target equipment when the acquired output control information includes control for the vehicle controller 139. Also, the sub-agent function element 154 may generate an image or a speech sound according to an instruction from the master agent function element 152.

Also, the sub-agent function element 154 may receive the input of the speech sound from the microphone 124B or the dialogue information and the output control information obtained from the communicator 110 through an application programming interface (API), select function elements for executing a process based on the received input (the display controller 156, the speech sound controller 158, and the equipment controller 160), and cause the selected function element to execute the process via the API.

The display controller 156 generates an image of an anthropomorphic agent (hereinafter referred to as an agent image) that communicates with the occupant within the vehicle under the control of the sub-agent function element 154 and causes the display 132 to display the generated agent image. For example, the agent image is an image of a form in which the agent speaks to the occupant. The agent image includes, for example, a face image of a degree at which at least a viewer (an occupant) recognizes a facial expression and a face orientation. For example, in the agent image, imitation parts of eyes and a nose are shown in the face area and the facial expression or the face orientation is recognized on the basis of positions of the parts in the face area. Also, the agent image is three-dimensionally recognized and the viewer may recognize the face orientation of the agent when a head image is included in the three-dimensional space or recognize a motion, behavior, a posture, and the like of the agent when an image of a main body (a body and limbs) is included therein. Also, the agent image may be an animation image.

Also, the display controller 156 converts the image included in the output control information into a display form (for example, an image size or an image format) for causing the display 132 indicated by the sub-agent function element 154 to display the image and causes the indicated display 132 to display the converted image.

The speech sound controller 158 causes a speech sound by which the agent image included in the dialogue information speaks to the occupant (hereinafter referred to as an agent speech sound) or a speech sound other than the agent speech sound (for example, a speech sound for content of a radio, music, a video, or the like) to be output from the speaker 134 under control of the sub-agent function element 154. At this time, the speech sound controller 158 may perform control for localizing the sound image of the agent speech sound at a position corresponding to the display position of the agent image using the plurality of speakers 134. For example, a position corresponding to a display position of the agent image is a position from which the occupant is expected to sense that the agent image is speaking using the agent speech sound. Specifically, the position is a position near the display position of the agent image (for example, within 2 to 3 [cm]). Also, for example, the localization of the sound image is the determination of a spatial position of the sound source sensed by the occupant by adjusting a volume of a speech sound transferred to the left and right ears of the occupant. For example, the sound image is determined on the basis of sound characteristics inherently possessed by the sound source, information about an environment within the vehicle cabin, and a head-related transfer function (HRTF). Using such a principle, the sound image can be localized at a predetermined position.

FIG. 5 is a diagram for describing the movement of a position where the sound image is localized. Although the above-described speakers 134C to 134E are used for simplification of the description in FIG. 5, the position where the sound image is localized can be spatially moved using the speakers 134A to 134H provided within the vehicle cabin. For example, if the sound image is localized at a spatial position MP1 determined by the three-dimensional coordinates (X, Y, Z) shown in FIG. 5, an occupant P1 senses from a position of the occupant P1 as if the sound image is localized at the spatial position MP1 shown in FIG. 5 when the AMP 136 outputs a speech sound of a predetermined output target at 5% of a maximum intensity from the speaker 134C, outputs a speech sound of a predetermined output target at 80% of the maximum intensity from the speaker 134D, and outputs a speech sound of a predetermined output target at 15% of the maximum intensity from the speaker 134E on the basis of a speech sound generated by the speech sound controller 158.

Also, the occupant P1 can sense from a position of the occupant P1 as if the sound image is localized at a spatial position MP2 shown in FIG. 4 when the AMP 136 outputs a speech sound of an output target at 45% of a maximum intensity from the speaker 134C, outputs a speech sound of an output target at 45% of the maximum intensity from the speaker 134D, and outputs a speech sound of an output target at 45% of the maximum intensity from the speaker 134E. In this way, it is possible to change a position where a sound image is localized by adjusting the plurality of speakers provided within the vehicle cabin and the volume of the speech sound output from each speaker. Hereinafter, a position MP in a space where the sound image is localized will be referred to as a "sound image position MP."

The equipment controller 160 executes control of the vehicle controller 139 on the basis of equipment control information included in the output control information. For example, the control of the vehicle controller 139 includes turning on/off the air conditioner, adjusting the temperature, turning on/off the vehicle interior light, adjusting the reclining angle, opening/closing the side windshield, and the like.

[Server]

Next, a schematic configuration of the server 200 will be described with reference to the drawings. Also, although the servers 200A to 200C shown in FIG. 1 are provided for the sub-agent function elements 154A to 154C, the servers 200A to 200C will be collectively described as a "server 200" because the schematic configurations of the servers 200A to 200C are substantially similar except for content of an answer information DB to be described below.

FIG. 6 is a diagram showing an example of a functional configuration of the server 200. The server 200 includes, for example, a communicator 210, a recognizer 220, a dialogue generator 230, and a storage 240. For example, these components are implemented by a computer processor such as a CPU executing a program (software). Also, some or all of these components may be implemented, for example, by hardware (a circuit including circuitry) such as an LSI circuit, an ASIC, an FPGA, or a GPU or may be implemented by software and hardware in cooperation. The program may be pre-stored in the storage 240 or may be stored in a removable storage medium such as a DVD or a CD-ROM and installed in the storage 240 when the storage medium is mounted in a drive device.

For example, the storage 240 is implemented by an HDD, a flash memory, an EEPROM, a ROM, a RAM, or the like. For example, the storage 240 stores a personal profile 242, an answer information DB 244, other information, and the like.

The communicator 210 communicates with the agent device 100 via the network NW using, for example, a cellular network, a Wi-Fi network, Bluetooth, DSRC, or the like. The communicator 210 receives information including a speech sound (for example, a speech sound stream) transmitted from the agent device 100. Also, the communicator 210 transmits the dialogue information including the speech sound generated by the dialogue generator 230 or the image or the output control information for equipment to the agent device 100.

For example, the recognizer 220 recognizes the meaning of a speech sound from the speech sound stream received by the communicator 210. Specifically, the recognizer 220 detects a speech sound section on the basis of amplitude or zero intersection of a speech sound waveform in the speech sound stream transmitted from the agent device 100 or the like. Also, the recognizer 220 may perform section detection based on speech/non-speech sound identification based on GMM in units of frames. Also, the recognizer 220 recognizes the speech sound in the detected speech sound section and converts the speech sound into text information. Also, the recognizer 220 may identify features of a speaker from the recognized speech sound. The features of the speaker include, for example, a gender, an age, and information about whether the speaker is a driver or a passenger.

Also, the recognizer 220 may perform collation with a personal profile 242 stored in the storage 240 using the feature information obtained from the speech sound. In the personal profile 242, for example, personal information is associated with speech sound feature information. The speech sound feature information is, for example, information about feature quantities based on speaking features such as a sound pitch, an intonation, a rhythm (a sound pitch pattern), and a pose, and mel frequency cepstrum coefficients. For example, the speech sound feature information is information obtained by allowing the occupant to utter a predetermined word or sentence at the time of initial registration of the occupant and recognizing an uttered speech sound. The personal information includes, for example, a name, an address, an age, a hobby, and a past usage history of the server 200. The name, the address, the age, and the hobby are set together with the speech sound feature information at the time of initial registration of the occupant and then appropriately updated according to a setting change or the like. The recognizer 220 collates the feature information obtained from the speech sound with the feature information of the personal profile 242 stored in the storage 240 and recognizes the personal information associated with the matching feature information.

Also, the recognizer 220 executes natural language processing on the text information obtained through the conversion and recognizes the meaning of the text information. The natural language processing includes morphological analysis, syntactic analysis, semantic analysis, context analysis, and the like. Also, the recognizer 220 generates a command corresponding to the recognized meaning.

Also, the dialogue generator 230 acquires control content corresponding to a matching command with reference to a command of the answer information DB 244 stored in the storage 240 using the command input from the recognizer 220. Also, the answer information DB 244 differs according to the functions that can be executed by the sub-agent function elements 154A to 154C. Hereinafter, the answer information DB provided in each of the server 200A and the server 200B will be described.

FIG. 7 is a diagram showing an example of content of the answer information DB 244A provided in the server 200A. In the answer information DB 244A, for example, command information is associated with the control content to be executed by the sub-agent function element 154A. For example, the control content of the answer information DB 244B includes information about equipment control (activation/stopping) for the in-vehicle equipment, output control of the agent speech sound, control of an image to be displayed on the display 132, and the like. The content included in the answer information DB 244A is associated with the executable functions in the above-described function information table 172 shown in FIG. 4. The control for commands of "activation of the air conditioner," "stopping of the air conditioner," and "turning on of the vehicle interior light" shown in FIG. 7 is control included in the in-vehicle equipment control function. Also, the control for a command "What is the distance to A?" is control included in the route guidance function. Also, the control for a command "What is the nearby restaurant?" is control included in the shop/store search function.

FIG. 8 is a diagram showing an example of content of the answer information DB 244B provided in the server 200B. In the answer information DB 244B, for example, the command information is associated with the control content to be executed by the sub-agent function element 154B. The answer information DB 244B includes output control of an agent speech sound, control of an image to be displayed on the display 132, application execution control, and the like. For example, the control for the command "turn on the radio" shown in FIG. 8 is control included in a radio control function. As described above, the server 200 can provide information that satisfies the occupant's request from a wide variety of information by providing the answer information DB 244 corresponding to each characteristic and field.

The dialogue generator 230 acquires the control content associated with the command. For example, when the command is "activation of the conditioner," the dialogue generator 230 acquires control content of the equipment control for activating the air conditioner installed in the vehicle M and control content of speech sound control for outputting the speech sound "The air conditioner has been activated," and control content of display control for displaying a temperature within the vehicle cabin and a set temperature.

Also, when the command is "What is the distance to station A?," the dialogue generator 230 acquires control content of speech sound control for outputting a speech sound "* [km] from here." and control content of display control for displaying a route image to station A. In this case, the dialogue generator 230 derives a travel distance from the position of the vehicle M to station A with reference to map information (not shown) stored in the storage 240 or the external device on the basis of position information of the vehicle M transmitted from the agent device 100. The dialogue generator 230 may generate the final speech sound information by substituting the derived travel distance into a part of "*" of "*** [km] from here." which is acquired control content of the speech sound control.

Also, the dialogue generator 230 generates dialogue information and output control information for having a dialogue with the occupant on the basis of the acquired control content. For example, the dialogue generator 230 generates speech sound information (a speech sound stream) for content (text information) obtained from the answer information DB 244 as dialogue information. The speech sound information includes, for example, an agent speech sound and other speech sounds. Also, the dialogue generator 230 may generate an agent image corresponding to content of the agent speech sound. Also, the dialogue generator 230 generates an image, a video, text information, and the like to be presented to the occupant as output control information and generates control information for equipment control. For example, when the answer obtained by the answer information DB 244 is "display control: an image of a route to station A is displayed," the dialogue generator 230 generates an image of a route from the position of the vehicle M to station A with reference to map information.

Also, when dialogue generator 230 may call a name of the occupant by a speech sound or generate speech sound information having a speaking style similar to that of the occupant on the basis of personal information when the personal information for the speech sound has been obtained by the recognizer 220. Also, the dialogue generator 230 may acquire information about the occupant's hobby obtained from the personal profile and include the acquired information in the dialogue information. The dialogue generator 230 transmits the generated dialogue information and output control information to the agent device 100 via the communicator 210.

[Details of Process Executed by Agent Device]

Next, details of a process executed by the agent device 100 will be described for each different scene. Hereinafter, a case in which the agent image output by the agent device 100 is displayed on the display 132A will be described.

<First Scene>

FIG. 9 is a diagram for describing the process executed by the agent device 100 in a first scene. The first scene is, for example, a scene in which the master agent function element 152 recognizes a word for calling any agent from a speech sound of the occupant. Also, in the first scene, it is assumed that speech sounds input by the microphones 124A and 124B are input to the speech sound input interface 152a of the master agent function element 152.

In the first scene, the master agent function element 152 causes the sub-agent function elements 154A to 154C to generate agent images EIA to EIC when a word for calling any agent is recognized. At this time, the master agent function element 152 changes a display form of each agent image. For example, when the word for calling any agent has been recognized, the master agent function element 152 determines agent A of the sub-agent function element 154A designated in advance as an agent that has a dialogue with the occupant. The master agent function element 152 causes the agent image EIA having a dialogue among the agent images EIA to EIC corresponding to the sub-agent function elements 154A to 154C generated by the display controller 156 to be displayed in front of the other agents EIB and EIC when viewed from the occupant. Also, the master agent function element 152 may adjust the size of each agent image in accordance with a positional relationship between the agent images EIA to EIC on the image space.

As shown in FIG. 9, the occupant can be allowed to easily ascertain that there are a plurality of agents by displaying the agent images EIA to EIC corresponding to the agents capable of having a dialogue with the occupant on the display 132. Also, it is possible to intuitively ascertain the agent having a dialogue by displaying the agent image EIA having a dialogue in front of the occupant.

Also, the master agent function element 152 causes the speech sound collected by the microphone 124B to be input to the speech sound input interface 154Aa of the sub-agent function element 154A. Thereby, the dialogue can be performed between the agent of the sub-agent function element 154A and the occupant on the basis of the speech sound collected by the microphone 124B and a function in the master agent function element 152 is continued on the basis of a speech sound input from the microphone 124A all the time.

The sub-agent function element 154A causes the speech sound controller 158 to adjust a sound image position MPA of the agent speech sound in association with the display position of the agent image EIA displayed on the display 132A. In the example of FIG. 9, the sound image position MPA is adjusted so that an agent speech sound "Are there any requests?" included in the dialogue information acquired from the server 200 can be heard from a position near the display position of the agent image EIA.

<Second Scene>

Figure 10:
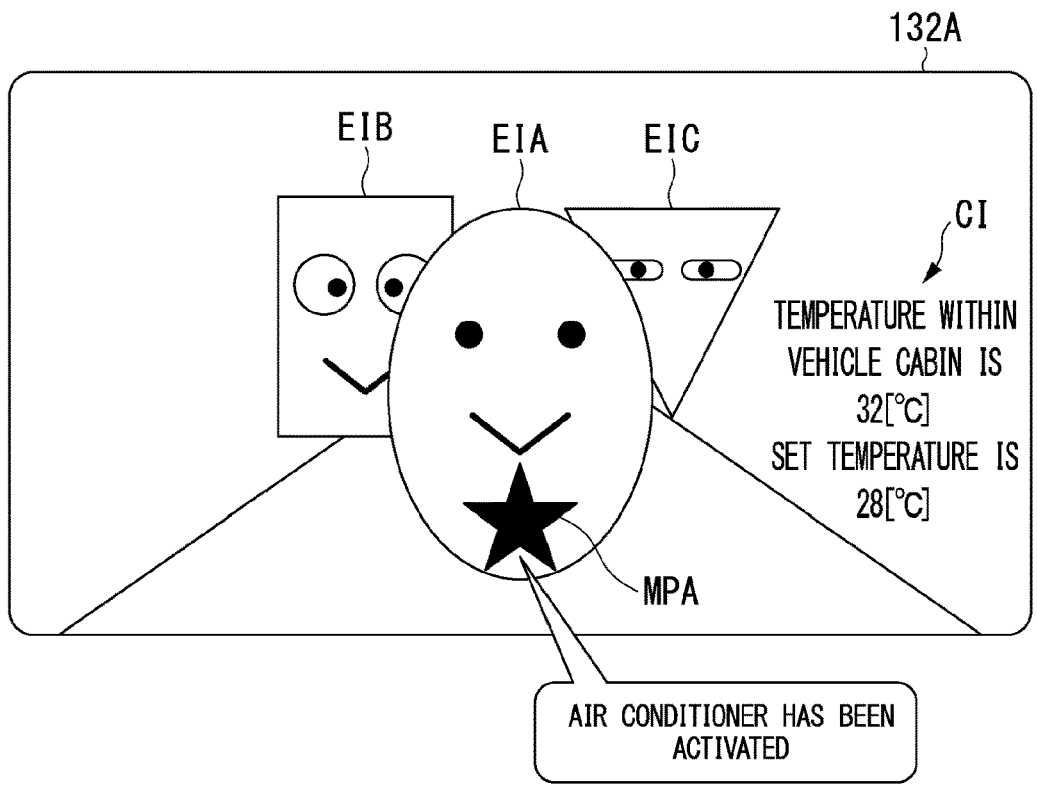
FIG. 10 is a diagram for describing a process executed by the agent device 100 in a second scene.

FIG. 10 is a diagram for describing a process executed by the agent device 100 in a second scene. The second scene is, for example, a scene in which a speech sound including a request corresponding to "activation of the air conditioner" is input from the occupant and control corresponding to the input request is executed. Also, it is assumed that the second scene is a continuous scene after the first scene described above.

In the second scene, the master agent function element 152 determines agent A (the sub-agent function element 154A) capable of implementing in-vehicle equipment control as an agent that has a dialogue with the occupant with reference to command information of the function information table 172 on the basis of a command "activation of the air conditioner" recognized from the speech sound of the occupant. At this time, although the master agent function element 152 causes the determined agent image EIA of agent A to be displayed in front of the other agent images EIB and EIC, a display form of the agent image shown in FIG. 9 is continued because the agent image EIA is already displayed at a near position in the first scene.

Also, in the second scene, the sub-agent function element 154A executes equipment control on the basis of the output control information acquired from the server 200. Also, the sub-agent function element 154A acquires a temperature within the vehicle cabin detected by a vehicle sensor (not shown) installed in the vehicle M and a set temperature set in the air conditioner on the basis of display control included in the output control information and causes the display 132 to display text information CI about the temperature within the vehicle cabin and the set temperature that have been acquired. In the example of FIG. 10, the sub-agent function element 154A causes the display 132A to display the text information CI representing that the temperature within the vehicle cabin is 32 [° C.] and the set temperature is 28 [° C.] under the control of the display controller 156.

Also, when the equipment control has been executed, the sub-agent function element 154A causes the sound image position MPA of the agent speech sound to be localized near the display position of the agent image EIA on the basis of the speech sound control content included in the dialogue information and causes an agent speech sound "The air conditioner has been activated" to be output.

Also, the sub-agent function element 154A may cause the facial expression of the agent image EIA, the tone of the agent speech sound, or the like to be changed on the basis of the control content for the request of the occupant. For example, when the control for the request of the occupant can be executed, the sub-agent function element 154A causes an agent image with a happy expression to be displayed or causes a tone of the agent speech sound higher than a reference tone to be output. Also, when the control for the request of the occupant cannot be executed, the sub-agent function element 154A causes an agent image with a sad expression to be displayed or causes the tone of the agent speech sound lower than the reference tone to be output.

Also, a change in the agent image or the agent speech sound may be associated with an agent that responds to the request or another agent. In the example of FIG. 10, the facial expressions of the agent image EIA of the sub-agent function element 154A that has responded to the request of the occupant and the agent image EIB of the sub-agent function element 154B that has not responded to the request are changed to the facial expressions of a smile. The generation of the image with the changed facial expression is executed by the sub-agent function element 154 that has received an instruction from the master agent function element 152.

<Third Scene>

Figure 11:
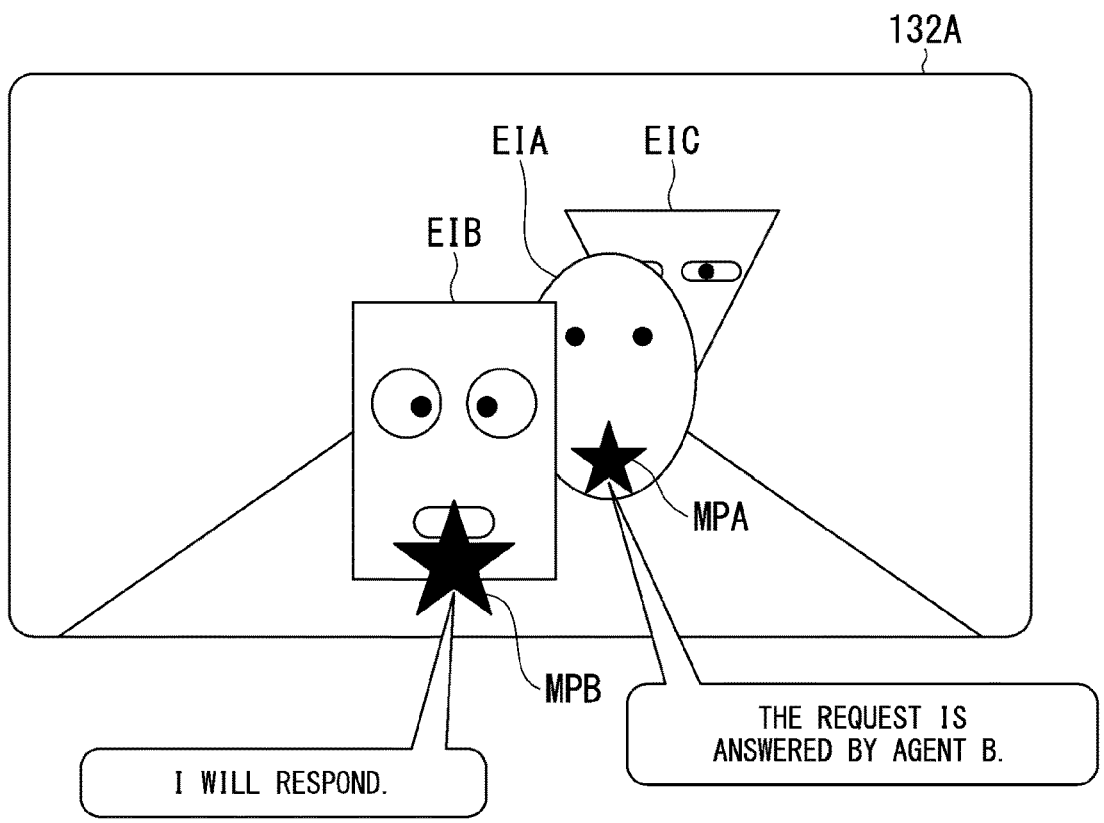
FIG. 11 is a diagram for describing a process executed by the agent device 100 in a third scene.

FIG. 11 is a diagram for describing a process executed by the agent device 100 in a third scene. The third scene is, for example, a scene in which an occupant requests function control that cannot be executed by agent A.

In the third scene, the master agent function element 152 determines agent (agent B in the example of FIG. 11) capable of implementing a function corresponding to the command as an agent that has a dialogue with the occupant with reference to command information of the function information table 172 on the basis of a command corresponding to a request recognized from the speech sound of the occupant. At this time, the master agent function element 152 changes a display form so that the agent image EIB is displayed in front of the other agent images EIA and EIC at the timing when a main agent that has a dialogue with the occupant is switched from the sub-agent function element 154A to the sub-agent function element 154B.

Also, when the display positions of the agent image EIA and the agent image EIB are replaced with each other, the master agent function element 152 may cause the target sub-agent function element 154 to generate an agent speech sound representing that the agent having the dialogue has been switched. For example, as shown in FIG. 11, when the main agent having the dialogue with the occupant is switched from agent A to agent B, the master agent function element 152 causes an agent speech sound such as "The request is answered by agent B." to be output from agent A and causes an agent speech sound such as "I will respond." to be output from agent B. In this case, the master agent function element 152 causes a sound image position MPA of the agent speech sound for agent A to be localized near the display position of the agent image EIA and causes a sound image position MPB of the agent speech sound for agent B to be localized near the display position of the agent image EIB. Thereby, the occupant can be allowed to sense that smooth cooperation is being performed between the agents.

Also, the master agent function element 152 switches the speech sound input collected by the microphone 124B from the speech sound input interface 154Aa of the sub-agent function element 154A to the speech sound input interface 154Ba of the sub-agent function element 154B. Thereby, a dialogue or the like can be implemented between agent B and the occupant.

<Fourth Scene>

Figure 12:
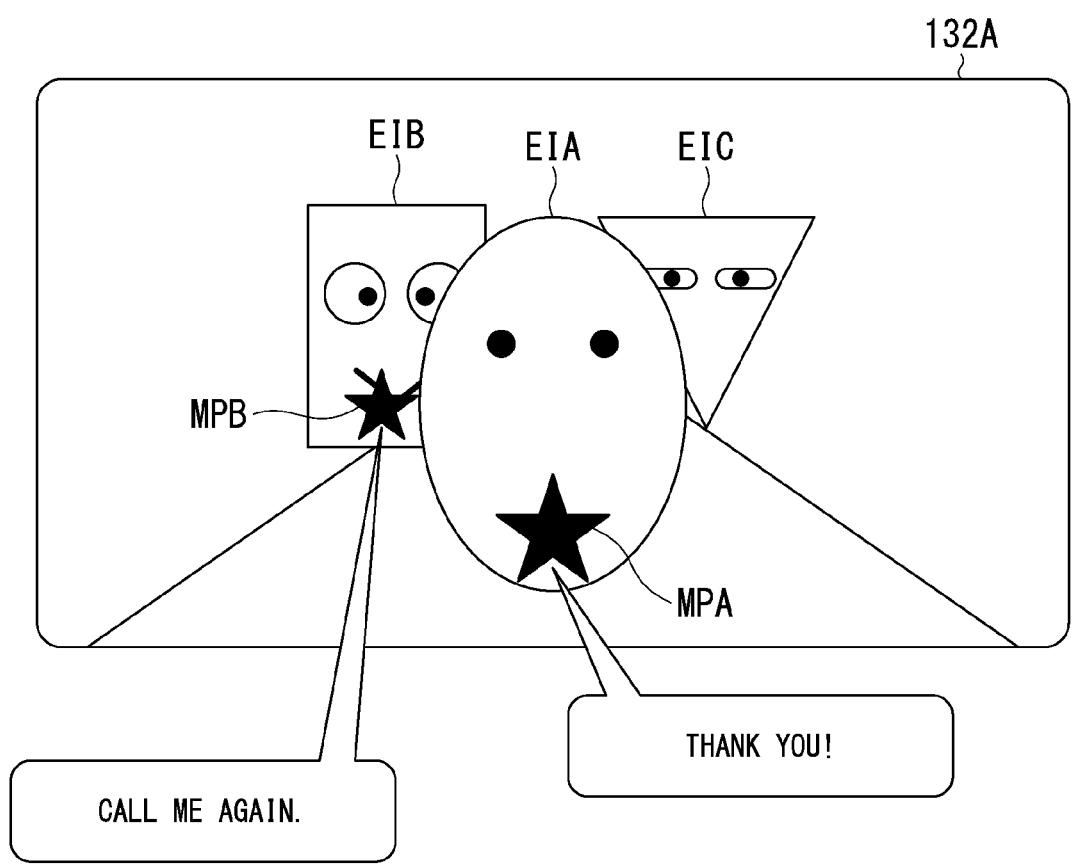
FIG. 12 is a diagram for describing a process executed by the agent device 100 in a fourth scene.

FIG. 12 is a diagram for describing a process executed by the agent device 100 in a fourth scene. The fourth scene is, for example, a scene in which the assistance for the occupant by agent B has been completed in the third scene.

In the fourth scene, the master agent function element 152 performs control for returning the main agent that has a dialogue with the occupant to agent A. Specifically, the master agent function element 152 causes the agent image EIA to be displayed in front of the other agent images EIB and EIC and switches the input of the speech sound collected by the microphone 124B from the speech sound input interface 154B a of the sub-agent function element 154B to the speech sound input interface 154Aa of the sub-agent function element 154A.

Also, when the display positions of the agent image EIA and the agent image EIB are replaced with each other, the master agent function element 152 may output an agent speech sound representing that the agent that has a dialogue has been switched. For example, as shown in FIG. 12, when the main agent that has a dialogue with the occupant is switched from agent B to agent A, the master agent function element 152 causes an agent speech sound such as "Thank you!" to be output from agent A to agent B and causes an agent speech sound such as "Call me again!" to be output from agent B to agent A. In this case, the master agent function element 152 causes the sound image positions MPA and MPB of the agent speech sound to be localized near the display positions of the agent images EIA and EIB. In this way, it is possible to make the occupant sense that smoother cooperation is being performed between the agents by outputting a pseudo conversation between agents.

In this way, the master agent function element 152 can provide more appropriate assistance based on the plurality of agents by performing control for automatically switching a main agent that has a dialogue with the occupant with respect to the plurality of agents.

Also, when information can be presented by a plurality of agents for one request as in a shop/store search, the master agent function element 152 can cause other agents as well as an agent designated by the occupant in the wake word to present information on its behalf. Therefore, more optimum information can be provided to the occupant. Also, the master agent function element 152 can manage the functions of a plurality of agents so that agent A can control the activation of the air conditioner, for example, while agent C is ordering a product.

[Processing Flow]

Figure 13:
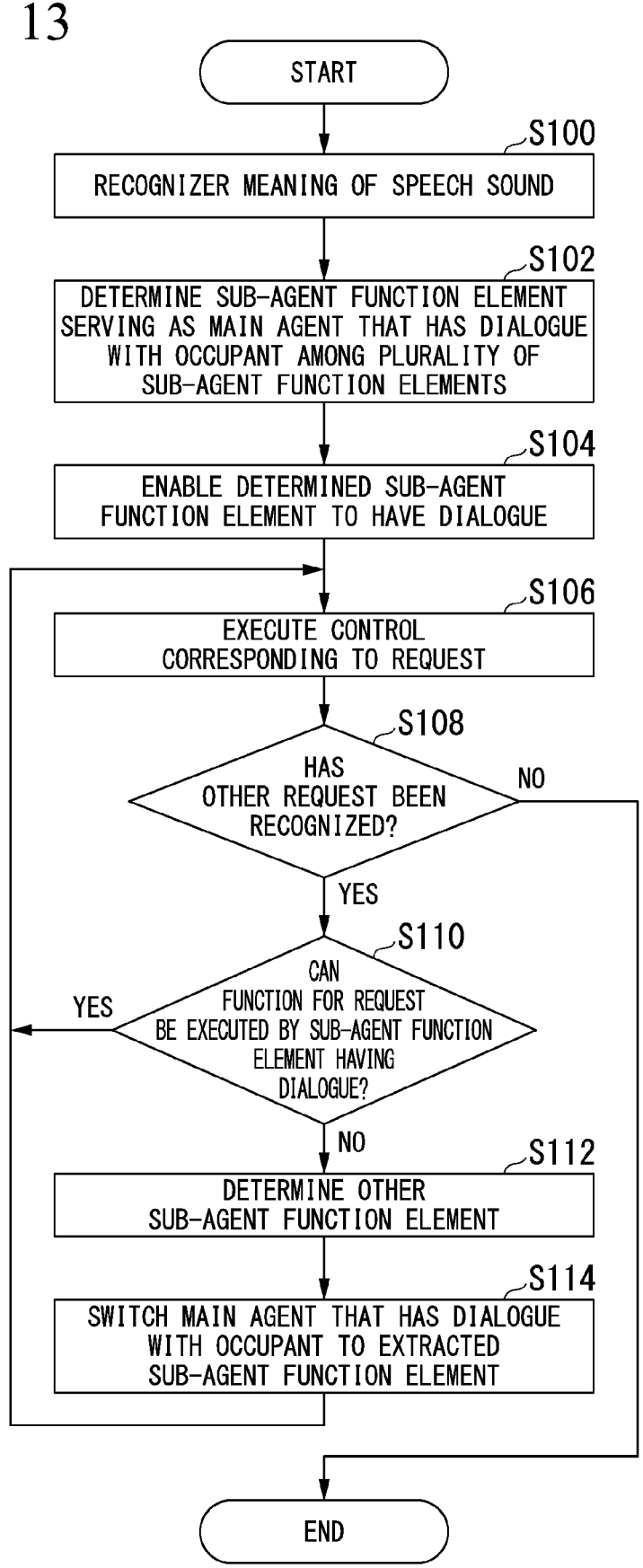
FIG. 13 is a flowchart showing an example of a flow of a series of processing steps of the agent device 100.

Hereinafter, a flow of a series of processing steps of the agent device 100 according to the first embodiment will be described with reference to a flowchart. FIG. 13 is a flowchart showing an example of a flow of a series of processing steps of the agent device 100. Also, FIG. 13 is a diagram for mainly describing a flow of processing steps of the master agent function element 152. The process of FIG. 13 may be iteratively executed at predetermined timings.

First, the master agent function element 152 inputs a speech sound collected by the microphone 124 through the speech sound input interface 152a and recognizes a meaning of the input speech sound (step S100). Next, the master agent function element 152 determines the sub-agent function element 154 serving as a main agent that has a dialogue with the occupant among the plurality of preset sub-agent function elements 154 from the recognized meaning of the speech sound (step S102). Next, the master agent function element 152 enables the determined sub-agent function element 154 to have a dialogue (step S104).

Next, the master agent function element 152 causes the determined sub-agent function element 154 to execute the control corresponding to the request (step S106). Also, the master agent function element 152 determines whether or not another request has been recognized (step S108). When the other request has been recognized, the master agent function element 152 determines whether or not a function for the request can be executed by the sub-agent function element 154 that has a dialogue with the occupant (step S110). When the function for the request can be executed, the process returns to step S106.

Also, when the function for the request cannot be executed, the master agent function element 152 determines another sub-agent function element capable of executing the function for the request among the plurality of sub-agent function elements 154 (step S112). Next, the master agent function element 152 switches the main agent that has a dialogue with the occupant to the determined sub-agent function element (step S114) and returns to the processing of step S106. Also, when no other request is recognized in the processing of step S108, the process of the present flowchart ends.

According to the first embodiment described above, it is possible to provide more appropriate assistance for the occupant. Specifically, according to the first embodiment, it is possible to cause a more appropriate agent to have a dialogue through switching to the more appropriate agent with respect to a request of the occupant by managing the functions that can be executed by a plurality of agents.

Second Embodiment

Next, a configuration of an agent device according to a second embodiment will be described. The agent device according to the second embodiment is different from the agent device 100 according to the first embodiment in that a master/sub-agent function element in which a master agent function element and one of a plurality of sub-agent function elements operate integrally is provided in an agent controller 150. Therefore, a configuration of the master/sub-agent function element will be mainly described below.

Figure 14:
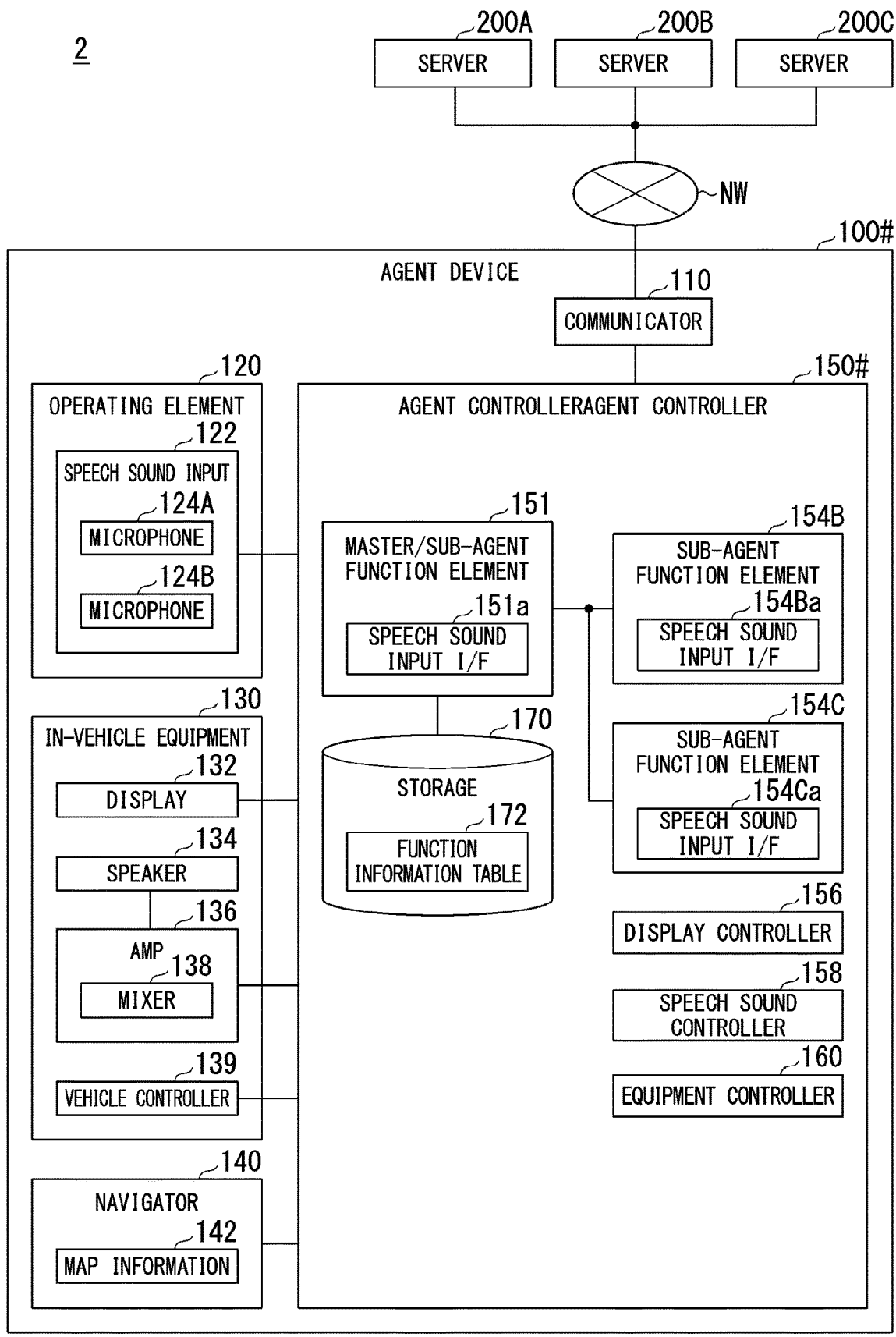
FIG. 14 is a configuration diagram of an agent system 2 including an agent device according to a second embodiment.

FIG. 14 is a configuration diagram of an agent system 2 including the agent device according to the second embodiment. An agent device 100# in the second embodiment includes, for example, a communicator 110, an operating element 120, in-vehicle equipment 130, a navigator 140, and an agent controller 150#. Also, the agent controller 150# includes, for example, a master/sub-agent function element 151, sub-agent function elements 154B and 154C, a display controller 156, a speech sound controller 158, an equipment controller 160, and a storage 170.

The master/sub-agent function element 151 includes, for example, a speech sound input interface 151a. Also, the master/sub-agent function element 151 includes, for example, the functions of the master agent function element 152 and the sub-agent function element 154A according to the first embodiment. Therefore, agent A provided by the master/sub-agent function element 151 functions as a master agent that manages other agents.

For example, agent A can be smoothly switched to another agent on the basis of a speech sound input from a microphone 124A to a speech sound input interface 151a all the time. Furthermore, for example, agent A can immediately respond to the call of agent A even while another agent (for example, agent B or agent C) is having a dialogue with the occupant, perform a shop/store search or the like simultaneously with another agent, and present more appropriate information to the occupant through adjustment between agents. Also, a function of controlling in-vehicle equipment is provided in agent A, so that it is possible to quickly respond without mediation of another agent when a command for controlling the in-vehicle equipment has been input from the occupant.

According to the second embodiment described above, in addition to achieving effects similar to those of the first embodiment, management of cooperation with other agents, adjustment of output content, and the like can be performed by making a specific agent resident as a master agent.

Third Embodiment

Next, a configuration of an agent device according to a third embodiment will be described. An agent system of the third embodiment is different from the agent system 1 of the first embodiment in that a function of a server 200 is provided in an agent controller. Therefore, a configuration of the agent controller will be mainly described below.

Figure 15:
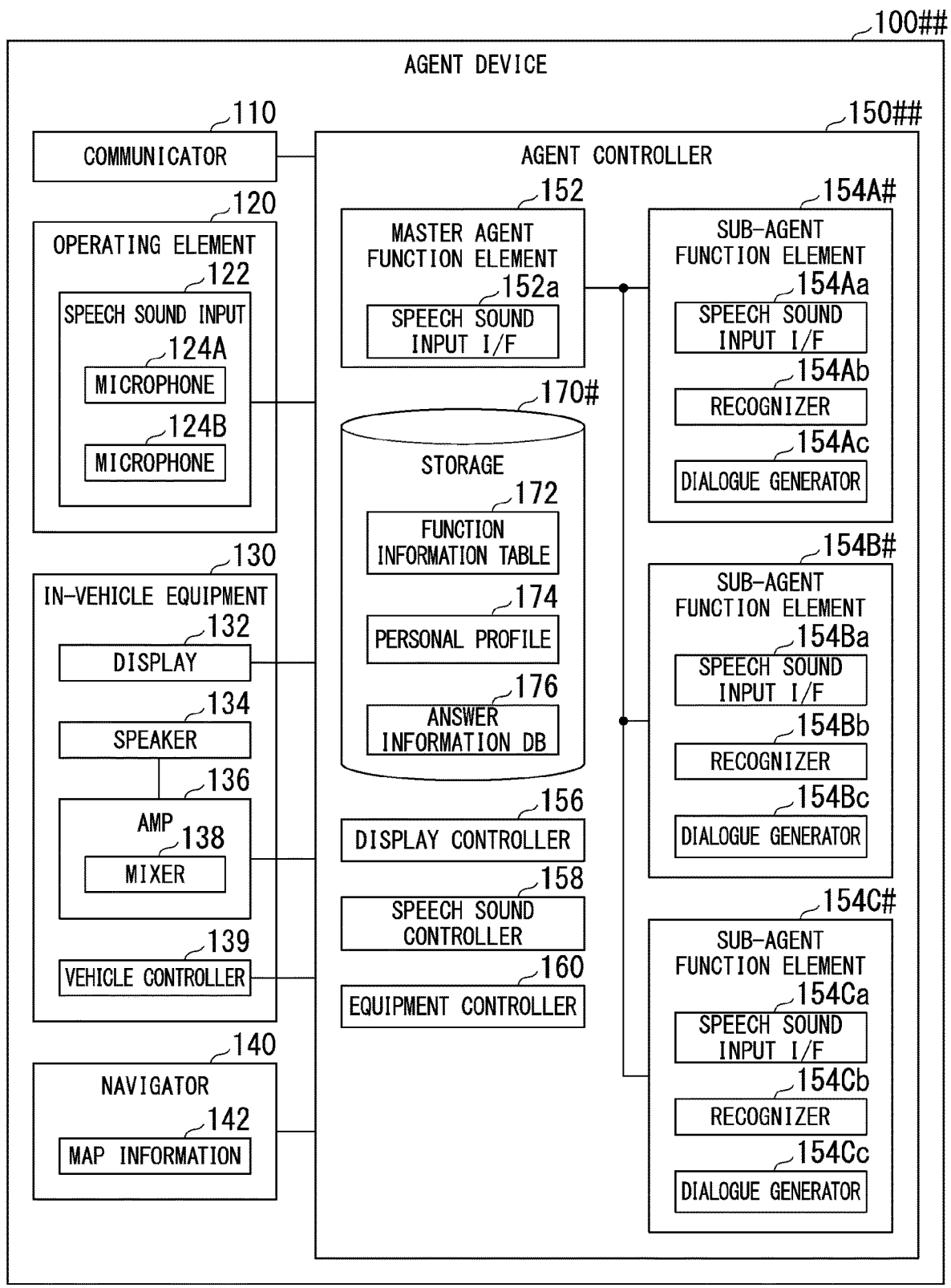
FIG. 15 is a configuration diagram of an agent system 3 including an agent device according to a third embodiment.

FIG. 15 is a configuration diagram of an agent system 3 including the agent device according to the third embodiment. An agent device 100## according to the third embodiment includes, for example, a communicator 110, an operating element 120, an in-vehicle equipment 130, a navigator 140, and an agent controller 150##. Also, the agent controller 150## includes, for example, a master agent function element 152, sub-agent function elements 154A# to 154C#, a display controller 156, a speech sound controller 158, an equipment controller 160, and a storage 170#.

The storage 170# includes a function information table 172, a personal profile 174, and an answer information DB 176. The personal profile 174 corresponds to the personal profile 242 of the first embodiment. Also, the answer information DB 176 corresponds to the answer information DB 244 of the first embodiment. Also, the answer information DB 176 may be provided for each of the sub-agent function elements 154A# to 154C#.

Also, the sub-agent function element 154A# includes, for example, a speech sound input interface 154Aa, a recognizer 154Ab, and a dialogue generator 154Ac. Likewise, the sub-agent function element 154B# includes, for example, a speech sound input interface 154Ba, a recognizer 154Bb, and a dialogue generator 154Bc. The sub-agent function element 154C# includes, for example, a speech sound input interface 154Ca, a recognizer 154Cb, and a dialogue generator 154Cc. The recognizer and the dialogue generator correspond to the recognizer 220 and the dialogue generator 230 provided in the server 200 of the first embodiment.

According to the third embodiment, the sub-agent function elements 154A# to 154#C can recognize information including speech sounds through the recognizers 154Ab to 154Cb without communicating with the server 200 and generate dialogue information and output control information with reference to the answer information DB 176 through the dialogue generators 154Ac to 154Cc. Also, the sub-agent function elements 154A# to 154#C can generate dialogue information and output control information based on the occupant's preference with reference to the personal profile 174.

According to the third embodiment described above, because the functions of the recognizer and the dialogue generator are provided in the sub-agent function elements 154A# to 154C#, it is possible to perform a quick information providing process for a request from an occupant without having to perform communication with the server 200. Also, the above-described first to third embodiments may be combined with some or all of the configurations of the other embodiments.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, some or all of the components of the server 200 according to the above-described embodiment may be provided within the agent device 100. Also, some or all of the components of the agent device of the above-described embodiment may be provided within the server 200.

REFERENCE SIGNS LIST

1 Agent system
100 Agent device
110 Communicator
120 Operating element
122 Speech sound input
124A, 124B Microphone
130 In-vehicle equipment 132 Display
134 Speaker
139 Vehicle controller
140 navigator
150 Agent controller
151 Master/sub-agent function element
152 Master agent function element
154 Sub-agent function element
156 Display controller
158 Speech sound controller
160 Equipment controller
170, 240 Storage
172 Function information table
174, 242 Personal profile
176, 244 Answer information DB
200 Server
210 Communicator
220 Recognizer
230 Dialogue generator

What is claim is:

1. An agent device comprising:
a microphone configured to collect a speech sound inside a vehicle cabin;
a speaker configured to output a speech sound inside the vehicle cabin;
a plurality of agent function elements having different functions;
a master agent function element configured to switch a main agent that has a dialogue with an occupant of the vehicle on the basis of the meaning of the speech sound collected by the microphone; and
a storage configured to store function information related to a function capable of being executed by each of the plurality of agent function elements,
wherein the master agent function element switches the agent function element to an agent function element capable of executing a function corresponding to the meaning of the speech sound with reference to the function information on the basis of the meaning of the speech sound collected by the microphone,
wherein each of the plurality of agent function elements generates a speech sound of an agent that speaks to an occupant of a vehicle on the basis of the meaning of the speech sound collected by the microphone and causes the speaker to output the generated speech sound of the agent,
wherein the agent function element serving as the main agent that has a dialogue with the occupant is switched through switching control of the master agent function element,
wherein a plurality of microphones are provided inside the vehicle cabin,
wherein one of inputs of the plurality of microphones is assigned to the master agent function element,
wherein a microphone assigned to the master agent function element has higher performance than other microphones, and
wherein the master agent function element inputs a speech sound from the assigned microphone all the time, and even when the occupant and the agent function element are in a dialogue, the switching control to switch the main agent that has a dialogue with the occupant is continued.

2. The agent device according to claim 1, wherein each of the plurality of agent function elements causes the speaker to output the speech sound of the agent so that a sound image of the generated speech sound of the agent is localized at a predetermined position.

3. The agent device according to claim 1, wherein the master agent function element and one of the plurality of agent function elements operate integrally.

4. The agent device according to claim 1, wherein equipment mounted in the vehicle is controlled by a specific agent function element among the plurality of agent function elements.

5. The agent device according to claim 1, further comprising a display configured to display an image,
wherein the plurality of agent function elements generate images of anthropomorphic agents that communicate with the occupant, and
wherein the master agent function element causes the display to display the images of the agents generated by the plurality of agent function elements and causes a display form of the image of the agent to be changed when a main agent that has a dialogue with the occupant is switched.

6. The agent device according to claim 1,
wherein the plurality of microphones are installed at positions within a predetermined distance inside the vehicle cabin.

7. The agent device according to claim 6, wherein speech sounds collected by the plurality of microphones are able to be input to a speech sound input interface of the master agent function element.

8. An agent control method comprising:
causing, by a computer, each of a plurality of agent function elements having different functions to generate a speech sound of an agent that speaks to an occupant of a vehicle on the basis of a meaning of a speech sound collected by a microphone configured to collect the speech sound inside a vehicle cabin; and
causing, by the computer, a speaker configured to output a speech sound inside the vehicle cabin to output the generated speech sound of the agent,
wherein the agent function element serving as a main agent that has a dialogue with the occupant is switched on the basis of content of the speech sound collected by the microphone,
wherein a plurality of microphones are provided inside the vehicle cabin,
wherein one of inputs of the plurality of microphones is assigned to a master agent function element of the plurality of agent function elements,
wherein a microphone assigned to the master agent function element has higher performance than other microphones, and
wherein the master agent function element inputs a speech sound from the assigned microphone all the time, and even when the occupant and the agent function element are in a dialogue, the switching control to switch the main agent that has a dialogue with the occupant is continued.

9. A non-transitory computer-readable storage medium that stores a program to be executed by a computer to perform at least:
cause each of a plurality of agent function elements having different functions to generate a speech sound of an agent that speaks to an occupant of a vehicle on the basis of a meaning of a speech sound collected by a microphone configured to collect the speech sound inside a vehicle cabin; and cause a speaker configured to output a speech sound inside the vehicle cabin to output the generated speech sound of the agent, wherein the agent function element serving as a main agent that has a dialogue with the occupant is switched on the basis of content of the speech sound collected by the microphone, wherein a plurality of microphones are provided inside the vehicle cabin, wherein one of inputs of the plurality of microphones is assigned to a master agent function element of the plurality of agent function elements, wherein a microphone assigned to the master agent function element has higher performance than other microphones, and wherein the master agent function element inputs a speech sound from the assigned microphone all the time, and even when the occupant and the agent function element are in a dialogue, the switching control to switch the main agent that has a dialogue with the occupant is continued.

* * * * *